Dec. 26, 1933.   E. B. TOLMAN, JR   1,940,894
SOOT VALVE AND SELF FEEDING INTAKE
Filed June 8, 1933
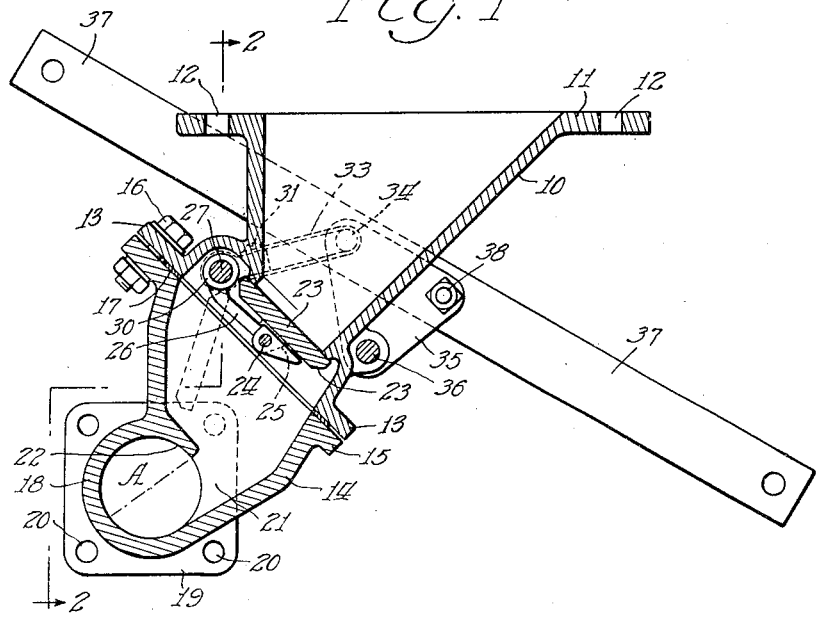
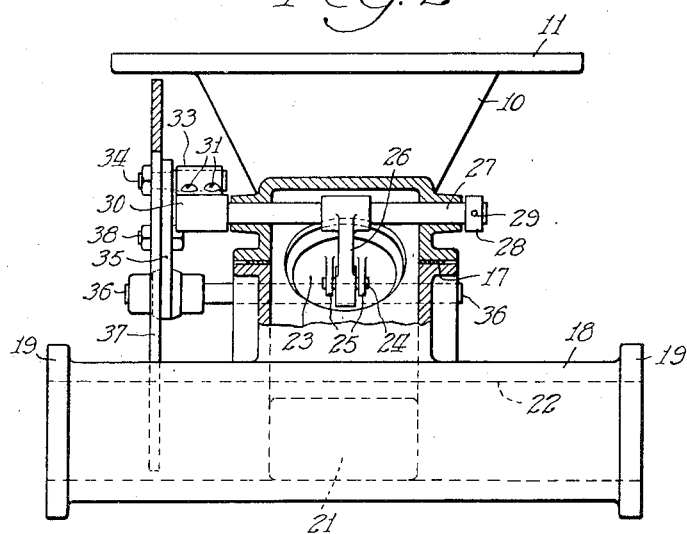
Witness:
V. Siljander
Inventor
Edgar B. Tolman Jr.
By:
Hill & Hill
Attys.

Patented Dec. 26, 1933

1,940,894

UNITED STATES PATENT OFFICE 1,940,894

SOOT VALVE AND SELF-FEEDING INTAKE

Edgar B. Tolman, Jr., Chicago, Ill.

Application June 8, 1933. Serial No. 674,856

2 Claims. (Cl. 302—36)

The invention relates to a combination fitting and air tight closure member adapted to control the flow of finely granulated substances from combustion chambers, storage hoppers and the base of stacks, or the like, into a pneumatic conveyor system. More particularly, the invention relates to means for the delivery of ash, fly ash, soot and similar materials from a receptacle into a conduit forming part of a pneumatic conveyor system.

An object of the invention is the provision of an improved fitting and air tight closure member for the inlet thereto, positioned entirely within the fitting, and operable to permit the contents of a hopper or similar container to flow freely into a conduit through which the material so discharged is conveyed by pneumatic action, the fitting being so constructed as to prevent the conduit from being completely filled with the material at the point of delivery, and thereby avoiding possibility of choking the conduit or retardation of the pneumatic action.

Another object of the invention is the provision of a novel closure member for a discharge opening of the kind described and means operable to open and close the closure member and to hold the closure member when open out of the path of material flowing through the opening and when closed to hold said member in position to seal the opening.

Another object of the invention is the provision of a device of the kind described which is simple, easily installed and manipulated, economical of construction and satisfactory for its intended purpose.

Many other objects and advantages of the construction herein shown and described will be obvious to those skilled in the art from the disclosure herein given.

To this end, my invention consists in the novel construction, arrangement and combination of parts herein shown and described, and more particularly pointed out in the claims.

In the drawing, wherein like reference characters indicate like or corresponding parts:

Fig. 1 is a vertical sectional view through a device embodying the principles of the invention; and Fig. 2 is a view along the line 2—2 of Fig. 1.

Referring now more particularly to the drawing, the numeral 10 generally designates a hopper adapted to be fastened to the bottom of a receptacle such as a storage hopper, combustion chamber or the base of a stack. The upper end of the hopper 10 is provided with a flange 11 having holes 12 therein for the insertion of bolts to secure the hopper to the underside of the storage receptacle. A member 14, providing a receptacle into which the hopper 10 discharges, has a flange 15 fastened by bolts 16 to a corresponding flange 13 on the lower edge of the hopper 10. A gasket 17 provides a sealed joint between the flanges 13 and 15. The hopper 10 has an outlet opening in its lower end through which its contents are discharged by gravity into the member 14. The lower end of the member 14 terminates in a transverse conduit section 18 adapted for insertion in a conveying conduit of a system. The ends of the section 18 each have a flange 19 equipped with holes 20 for insertion of bolts to connect the section with the adjacent portions of the conveying conduit.

The lower portion of the member 14 provides a passageway 21 opening into the lower part of the conduit 18 at an angle inclined downwardly to the horizontal. The material discharged into the conduit is conveyed by pneumatic action and in order that the pneumatic action be efficient and properly convey the material it is essential that the conduit section 18 be only partially filled with material. The inclination of the passageway 21 is such that material discharged from the hopper 10 into the fitting 14 will flow by gravity into the bottom portion of the section 18. The passageway 21 is restricted to the lower portion of the conduit 18 by a wall 22 and the material flowing from the fitting 14 is thereby prevented from completely filling the section 18.

It is desirable that the pneumatic conduit section 18 be completely sealed from the hopper 10 when material is not being discharged from the hopper into the conduit. For this purpose, I have provided a valve plate 23 as a closure member for the outlet opening in the bottom of the hopper 10, the lower edge of the hopper being machined or otherwise treated in order that the plate may form an air tight seal therewith.

In order to maintain the air tight fit of the plate 23 on its seat, it is desirable it be positioned out of the path of material discharged from the hopper 10 so that it will not be abraded, and for this purpose, it is pivotally mounted so as to be swung to the dotted line position of Fig. 1. The plate 23 is actuated from open to closed position and vice versa by means of a shaft 27. The plate 23 is connected with the shaft 27 by an arm 26. The free end of the arm 26 is positioned between a pair of lugs 25 formed on the outer edge of the plate 23 and a pin 24 extending through the lugs and the arm provides a pivotal connection for the plate. The other end of the arm 26 is fixedly fastened to the shaft 27 by a hub 30 and as a result, rotation of the shaft correspondingly rotates the plate 23.

The shaft 27 is rotated by manually actuating a lever 37. The lever 37 is operatively connected with the shaft 27 by means of a triangular shaped crank 35 and a spring lever 33. A shaft 36 mounted on the hopper 10 provides a pivotal support for the lower end of the crank 35. The upper end of the crank 35 is fastened to the lever 37 by a pin 34 and a bolt 38. The crank 35 is operatively connected with the shaft 37 by the spring lever 33 in which the pin 34 is slidably mounted. The crank 35 is preferably connected to the lever 37 near its midportion in a manner such that the lever is substantially balanced on the crank. Rotation of the lever 37 in counter clockwise direction as observed in Fig. 1 swings the pin 34 in an arc of a circle having a radius determined by the distance between the pin 34 and the shaft 36. The movement of the pin 34 in its arc causes it to slide away from the end of the spring lever 33 and at the same time rotates the lever to actuate the shaft 27 to move the plate 23 to its dotted line position. The position of the pin 34 relative to the shaft 36 and the bolt 38 is such that the pin 34 passes through a dead center as it is rotated as described and upon passing such dead center, the weight of the lever 37 and the crank 35 tends to hold the plate 23 in the dotted line position shown with the pin 34 bearing against the side of the spring lever 33. The plate 23 is returned to closed position by the opposite movement of the lever 37 resulting in corresponding opposite movement of the pin 34 and of the spring lever 33. The pin 34 upon passing the dead center in its return movement, takes the position shown in Fig. 1 at the end of the spring lever 33, wherein it is held by the action of the lever.

Thus it will be seen that I have provided an air tight closure member operable within a fitting through which material is discharged from a hopper into a pneumatic conveyor conduit; the closure member when open being held out of the path of the material and the fitting providing a passageway opening into the bottom of the conduit, whereby the conduit is prevented from being filled to capacity.

Having thus described my invention it is obvious that various immaterial modifications may be made in the same without departing from the spirit of the invention; hence I do not wish to be understood as limiting myself to the exact form, construction, arrangement and combination of parts herein shown and described or uses mentioned.

What I claim as new and desire to secure by Letters Patent is:

1. A hopper having an opening through which its contents are discharged by gravity, a conduit section extending in a generally horizontal direction below said hopper, a member providing a receptacle into which the hopper contents are discharged, a pivotally mounted plate providing a closure member for said opening, said plate operable to be swung out of the path of material when in open position and to form an air tight seal for said opening when in closed position, and means operable to open and close said plate, said means adapted to hold said plate against movement when in either open or closed position, the bottom of said receptacle providing a passageway adapted to direct the contents of the receptacle downwardly and laterally into the lower portion of the conduit section.

2. A hopper having an opening through which its contents are discharged by gravity, a conduit section extending in a generally horizontal direction below said hopper, a member providing a receptacle into which the hopper contents are discharged, a pivotally mounted plate providing a closure member for said opening, said plate operable to be swung out of the path of material when in open position and to form an air tight seal for said opening when in closed position, means operable to open and close said plate, said means adapted to hold said plate against movement when in either open or closed position, the bottom of said receptacle providing a passageway adapted to direct the contents of the receptacle downwardly and laterally into the conduit section, and means adapted to prevent the material entering said conduit section from filling the upper portion thereof.

EDGAR B. TOLMAN, Jr.